(12) United States Patent
Fukumoto et al.

(10) Patent No.: US 10,857,629 B2
(45) Date of Patent: Dec. 8, 2020

(54) ALUMINUM ALLOY BRAZING SHEET

(71) Applicant: UACJ Corporation, Tokyo (JP)

(72) Inventors: Atsushi Fukumoto, Tokyo (JP); Yasunaga Itoh, Tokyo (JP); Shoichi Sakoda, Tokyo (JP); Tomoki Yamayoshi, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 16/328,861

(22) PCT Filed: Aug. 24, 2017

(86) PCT No.: PCT/JP2017/030287
§ 371 (c)(1),
(2) Date: Feb. 27, 2019

(87) PCT Pub. No.: WO2018/043277
PCT Pub. Date: Mar. 8, 2018

(65) Prior Publication Data
US 2019/0184501 A1   Jun. 20, 2019

(30) Foreign Application Priority Data

Aug. 30, 2016 (JP) ................... 2016-167838

(51) Int. Cl.
*B23K 35/28* (2006.01)
*B23K 1/19* (2006.01)
(Continued)

(52) U.S. Cl.
CPC .............. *B23K 35/288* (2013.01); *B23K 1/00* (2013.01); *B23K 1/19* (2013.01); *B23K 31/02* (2013.01);
(Continued)

(58) Field of Classification Search
None
See application file for complete search history.

(56) References Cited

U.S. PATENT DOCUMENTS

| 6,129,143 A | 10/2000 | Hasegawa et al. |
| 8,043,711 B2 * | 10/2011 | Koshigoe .............. B32B 15/016 228/262.5 |
| 2015/0165564 A1 * | 6/2015 | Ahl ........................ B23K 1/012 428/654 |

FOREIGN PATENT DOCUMENTS

| CN | 101358311 A | 2/2009 |
| CN | 102574248 A | 7/2012 |

(Continued)

OTHER PUBLICATIONS

International Search Report dated Nov. 28, 2017, issued in counterpart International Application No. PCT/JP2017/030287, with English Translation. (6 pages).

(Continued)

*Primary Examiner* — Daniel J. Schleis
(74) *Attorney, Agent, or Firm* — Westerman, Hattori, Daniels & Adrian, LLP

(57) ABSTRACT

An aluminum alloy brazing sheet is disclosed including a core material made of pure aluminum or aluminum alloy, one side or both sides of the core material, being clad with a brazing material, with an intermediate material interposed between the core material and the brazing material, the intermediate material including 0.4 to 6 mass % of Mg, further including at least one of Mn, Cr, and Zr, and the balance being Al and inevitable impurities, having the Mn content not more than 2.0 mass %, the Cr content not more than 0.3 mass %, and the Zr content not more than 0.3 mass %, with the total content of Mn, Cr, and Zr being at least 0.1

(Continued)

mass %, the brazing material including 4 to 13 mass % of Si, and the balance being Al and inevitable.

9 Claims, 1 Drawing Sheet

(51) Int. Cl.
*B23K 1/00* (2006.01)
*B23K 35/22* (2006.01)
*C22C 21/00* (2006.01)
*B23K 31/02* (2006.01)
*B23K 35/02* (2006.01)
*B32B 15/01* (2006.01)
*C22F 1/00* (2006.01)
*C22F 1/04* (2006.01)
*B23K 103/10* (2006.01)
*B23K 101/14* (2006.01)

(52) U.S. Cl.
CPC .......... *B23K 35/0238* (2013.01); *B23K 35/22* (2013.01); *B23K 35/28* (2013.01); *B32B 15/016* (2013.01); *C22C 21/00* (2013.01); *B23K 2101/14* (2018.08); *B23K 2103/10* (2018.08); *C22F 1/00* (2013.01); *C22F 1/04* (2013.01); *Y10T 428/12764* (2015.01)

(56) References Cited

FOREIGN PATENT DOCUMENTS

| CN | 104395028 A | 3/2015 |
| EP | 2848354 A1 | 3/2015 |
| JP | 10-53828 A | 2/1998 |
| JP | 2004-358519 A | 12/2004 |
| JP | 2007-152422 A | 6/2007 |
| JP | 2013123749 A | 6/2013 |
| JP | 2013-233552 A | 11/2013 |
| JP | 2015-528852 A | 10/2015 |

OTHER PUBLICATIONS

Extended (supplementary) European Search Report dated Feb. 10, 2020, issued in counterpart EP Application No. 17846282.6. (8 pages).
Office Action dated Jul. 3, 2020, issued in counterpart CN Application No. 201780053570.9, with English Translation. (20 pages).
Office Action dated Jul. 17, 2020, issued in counterpart JP Application No. 2016-167838, with English Translation. (9 pages).

* cited by examiner

ALUMINUM ALLOY BRAZING SHEET

TECHNICAL FIELD

The present invention relates to an aluminum alloy brazing sheet used for brazing aluminum, without using flux, in an inert gas atmosphere or a vacuum.

BACKGROUND ART

Brazing is widely used as a method for jointing products including a number of fine jointing portions, such as aluminum heat exchanges and mechanical components. Brazing aluminum (including aluminum alloys) requires breaking an oxide film covering the surface, and bring the molten brazing material into contact with base metal or brazing material molten in the same manner. Methods for breaking an oxide film are broadly classified into a method of using flux and a method of heating the oxide film in vacuum, and both of them are put to practical use.

An application range of brazing is wide, and the most typical example is a heat exchanger for vehicles. Most of heat exchangers for vehicles, such as radiators, heaters, condensers, and evaporators, are made of aluminum, and most of them are manufactured by brazing. Among those methods, a method of applying a noncorrosive flux and heating it in a nitrogen gas accounts for the majority part of the methods at present.

In recent years, due to change in the driving system in electric cars or hybrid cars, heat exchangers equipped with electronic components have appeared, with increasing cases where the residue of flux is concerned. Although some methods are available that manufacture such heat exchangers by vacuum brazing, vacuum brazing requires high equipment and maintenance costs for the heating furnace, and has problems in productivity and brazing stability. Such a situation increases needs for brazing without using flux in a nitrogen gas furnace.

To satisfy these needs, methods are presented that diffuse Mg into the brazing material during brazing heating, so as to enable brazing without using flux in an inert gas atmosphere. Examples of these methods include a method of diffusing Mg added to the core material into the brazing material. These methods prevent an oxide film from being formed on the surface of the brazing material during manufacturing of a clad material and brazing heating, and enable Mg to effectively act on the destruction of the oxide film on the surface of the brazing material (Patent Literature 1).

In addition, a method is presented that provides an intermediate material between brazing material including Li and a core material including Mg so as to cause the intermediate material to include Mg. The Li added to the brazing material, and the Mg added to the core material and the intermediate material cause the oxidized film on the surface of the brazing material to be broken during brazing heating, so as to allow brazing without using flux in an inert gas atmosphere (Patent Literature 2).

PRIOR ART DOCUMENT

Patent Literatures

[Patent Literature 1] Japanese Patent Publication 2004-358519-A
[Patent Literature 2] Japanese Patent Publication 2013-233552-A

SUMMARY OF INVENTION

Problem to be Solved

The method with which Mg added to the core material is diffused into the brazing material, however, has a limitation in an amount of Mg that can be added to the core material, from a viewpoint of securing the solidus temperature of the core material at the brazing temperatures or above. This makes it impossible to acquire a sufficient amount of Mg for breaking the oxidized film during brazing, and impossible to secure favorable brazing properties in some cases.

Moreover, although the method that provides an intermediate material between a brazing material including Li and a core material including Mg so as to cause the intermediate material to include Mg has no limitation in the addition quantity of Mg due to the intermediate material being provided, in a case when the brazing material is thick or under a condition of fast temperature rising during brazing, for example, there is a possibility that Mg is not diffused sufficiently and a film break effect is not sufficiently provided.

Thus, an objective of the present invention is to provide an aluminum alloy brazing sheet enabling excellent brazing properties, when aluminum is brazed without using flux in an inert gas atmosphere such as the nitrogen gas atmosphere or vacuum, by Mg being smoothly supplied into the brazing material during brazing heating, this Mg being sufficiently eluted in the molten brazing material after start of melting the brazing material, and the oxide film on the surface of the brazing material being effectively embrittled.

Means for Solving the Problem

The inventors of the present invention have found that, as a result of zealous research to solve the above problems, a clad material having a specific alloy composition and a specific configuration conforms to the objective, and have completed the present invention based on the findings.

That is, the present invention (1) relates to a brazing sheet used for brazing aluminum in an inert gas atmosphere or vacuum, the brazing sheet providing an aluminum alloy brazing sheet comprising a core material made of pure aluminum or aluminum alloy, one side or both sides of the core material being clad with a brazing material, with an intermediate material interposed between the core material and the brazing material, the intermediate material including 0.4 to 6 mass % of Mg, further including at least one of Mn, Cr, and Zr, and the balance being Al and inevitable impurities, having the Mn content not more than 2.0 mass %, the Cr content not more than 0.3 mass %, and the Zr content not more than 0.3 mass %, with the total content of Mn, Cr, and Zr being at least 0.1 mass %, the brazing material including 4 to 13 mass % of Si, and the balance being Al and inevitable impurities.

The present invention (2) provides the aluminum alloy brazing sheet (1) in which the intermediate material has the average grain size of 200 μm or less.

The present invention (3) provides the aluminum alloy brazing sheet of (1) or (2), in which the core material includes at least one of Mn not more than 1.8 mass %, Si not more than 1.5 mass %, Fe not more than 1.0 mass %, Cu not more than 1.2 mass %, Ti not more than 0.3 mass %, and Zr not more than 0.3 mass %, and the balance being Al and inevitable impurities.

The present invention (4) provides the aluminum alloy brazing sheet of (3), in which the core material further includes 0.2 to 1.5 mass % of Mg.

The present invention (5) provides the aluminum alloy brazing sheet of any one of (1) to (4), in which the brazing, material further includes 0.004 to 0.2 mass % of Bi.

The present invention (6) provides the aluminum alloy brazing sheet of any one of (1) to (5), in which the intermediate material further includes 1 to 13 mass % of Si.

The present invention (7) provides the aluminum alloy brazing sheet of any one of (1) to (6), in which the intermediate material further includes 0.01 to 1.5 mass % of Bi.

The present invention (8) provides the aluminum alloy bracing sheet of any one of (1) to (7), in which the intermediate material further includes 0.5 to 8 mass % of Zn.

The present invention (9) provides the aluminum alloy brazing sheet of any one of (1) to (8), in which one side of the core material is clad with the brazing material with the intermediate material interposed therebetween, and the other side of the core material is clad with a sacrificial anode material including 0.5 to 8 mass % Zn and the balance being Al and inevitable impurities.

The present invention (10) provides the aluminum alloy brazing sheet of (9), in which the sacrificial anode material further includes 0.1 to 2.0 mass of Mn.

Effects of the Invention

The present invention provides an aluminum alloy brazing sheet enabling excellent brazing properties, when aluminum is brazed without using flux in an inert gas atmosphere such as the nitrogen gas atmosphere or vacuum, by Mg being smoothly supplied into the brazing material during brazing heating, this Mg being sufficiently eluted in the molten brazing material after start of melting the brazing material, and the oxide film on the surface of the brazing material being effectively embrittled.

EMBODIMENTS OF THE INVENTION

Figure 1:
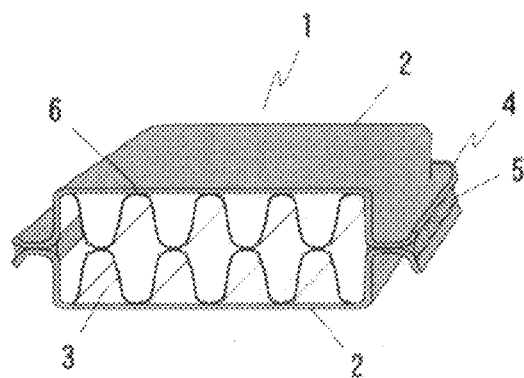
FIG. 1 is an outside drawing of a cup test piece to evaluate a fillet formation state in an example of the present invention.

The present invention relates to a brazing sheet used for brazing aluminum in an inert gas atmosphere or vacuum, the brazing sheet providing an aluminum alloy brazing sheet comprising a core material made of pure aluminum or aluminum alloy, one side or both sides of the core material being clad with a brazing material, with an intermediate material interposed between the core material and the brazing material, the intermediate material including 0.4 to 6 mass % of Mg, further including at least one of Mn, Cr, and Zr, and the balance being Al and inevitable impurities, having the Mn content not more than 2.0 mass %, the Cr content not more than 0.3 mass %, and the Zr content not more than 0.3 mass %, with the total content of Mn, Cr, and Zr being at least 0.1 mass %, the brazing material including 4 to 13 mass % of Si, and the balance being Al and inevitable impurities.

The aluminum alloy brazing sheet of the present invention is a brazing sheet used for brazing aluminum, without using flux, in an inert gas atmosphere, such as a nitrogen gas or an argon gas atmosphere, or a vacuum. That is, the aluminum alloy brazing sheet of the present invention is a brazing sheet used for fluxless brazing in an inert gas atmosphere or a vacuum.

The aluminum alloy brazing sheet of the present invention is a clad material in which one side or both sides of a core material is clad with a brazing material with an intermediate material interposed between the core material and the brazing material. Among the aluminum alloy brazing sheets of the present invention, an aluminum alloy brazing sheet having one side of the core material clad with a brazing material with the intermediate material interposed between the core material and the brazing material may have the other side of the core material clad with a sacrificial anode material. That is, the aluminum alloy brazing sheet of the present invention is: an aluminum alloy brazing sheet (1) including a core material, an intermediate material, and an brazing material, only one side of the core material being clad with the intermediate material and the brazing material in a laminating manner in this order from the core material side (the other side of the core material clad with nothing); an aluminum alloy brazing sheet (2) including a core material, an intermediate material, and a brazing material, one side of the core material being clad with the intermediate material and the brazing material in a laminating manner in this order from the core material side, with the other side of the core material being clad with an intermediate material and an brazing material in a laminating manner in this order from the core material side; or an aluminum alloy brazing sheet (3) including a core material, an intermediate material, and a brazing material, one side of the core material being clad with intermediate material and the brazing material in a laminating manner in this order from the core material side, with the other side of the core material being clad with a sacrificial anode material.

The core material according to the aluminum alloy brazing sheet of the present invention is made of pure aluminum or aluminum alloy.

Examples of the core material according to the aluminum alloy brazing sheet of the present invention include a core material made of aluminum alloy including at least one of Mn not more than 1.8 mass %, Si not more than 1.5 mass Fe not more than 1.0 mass Ti not more than 0.3 mass %, and Zr not more than 0.3 mass %, and the balance being Al and inevitable impurities. In addition, examples of the core material according to the aluminum alloy brazing sheet of the present invention include a core material made of aluminum alloy including at least one of Mn not more than 1.8 mass %, Si not more than 1.5 mass %, Fe not more than 1.0 mass %, Ti not more than 0.3 mass %, and Zr not more than 0.3 mass %, further including 0.2 to 1.5 mass % of Mg, and the balance being Al and inevitable impurities.

The Mn in the core material, together with Fe and Si, forms Al—Fe—Mn-based, Al—Mn—Si-based, and Al—Fe—Mn—Si-based intermetallic compounds, which function to provide dispersion strengthening, or is dissolved into a matrix to improve the material strength through solid solution strengthening. Moreover, the Mn in the core material provides an electropositive potential to increase a potential difference between the core material and the sacrificial anode material or a fin, so as to improve an anti-corrosion effect through a sacrificial anode effect. The Mn content in the core material is preferably not more than 1.8 mass more preferably 0.3 to 1.5 mass %. A Mn content in the core material exceeding 1.8 mass % causes an easy formation of giant intermetallic compounds during casting, and easily lowers the plastic workability.

The Si in the core material, together with Fe and Mn, form Al—Mn—Si-based, Al—Fe—Si-based, and Al—Fe—Mn—Si-based intermetallic compounds, which function to provide dispersion strengthening, or is dissolved into a matrix to improve the material strength through solid solution strengthening. Moreover, the Si in the core material reacts with Mg to provide $Mg_2Si$ compound, the aging precipitation of which has an effect on the improvement of the strength. The Si content in the core material is preferably not more than 1.5 mass %, more preferably 0.2 to 1.0 mass %. A Si content in the core material exceeding 1.5 mass % lowers the solidus temperature (melting point), thereby increasing the possibility of causing the core material to be molten during brazing.

The Fe in the core material, together with Mn and Si, form Al—Fe—Mn-based, Al—Fe—Si-based, and Al—Fe—Mn—Si-based intermetallic compounds, which function to provide dispersion strengthening, so as to improve the material strength. The Fe content in the core material is preferably not more than 1.0 mass %, more preferably 0.05 to 0.7 mass %. A Fe content in the core material exceeding 1.0 mass % causes an easy formation of giant intermetallic compounds during casting, and easily lowers the plastic workability.

The Cu in the core material improves the material strength through solid solution strengthening. Moreover, the Cu in the core material provides an electropositive potential to increase a potential difference between the core material and the sacrificial anode material or a fin, so as to improve an anti-corrosion effect through a sacrificial anode effect. The Cu content in the core material is preferably not more than 1.2 mass %, more preferably 0.05 to 1.0 mass %. A Cu content in the core material exceeding 1.2 mass % increases the possibility of occurrence of intergranular corrosion and the possibility of melting due to decrease in the melting point of the core material.

The Ti in the core material improves the strength through solid solution strengthening, and has an effect of improving anti-corrosion properties. The Ti content in the core material is preferably not more than 0.3 mass more preferably 0.1 to 0.2 mass %. A Ti content in the core material exceeding 0.3 mass % causes an easy formation of giant intermetallic compounds during casting, and easily lowers the plastic workability.

The Zr in the core material improves the strength through solid solution strengthening, or causes an Al—Zr-based fine compound to precipitate, thereby having an effect on coarsening after brazing. The Zr content in the core material is preferably not more than 0.3 mass %, more preferably 0.1 to 0.2 mass %. A Zr content in the core material exceeding 0.3 mass % causes an easy formation of giant intermetallic compounds during casting, and easily lowers the plastic workability.

The Mg in the core material is dissolved into the matrix to improve the material strength through solid solution strengthening. Moreover, the Mg in the core material reacts with Si to provide $Mg_2Si$ compound, the aging precipitation of which has an effect on the improvement of the strength. The Mg content in the core material is preferably 0.2 to 1.5 mass %, more preferably 0.3 to 1.2 mass %. The Mg content in the core material being less than 0.2 mass % easily causes deficiency in the above effect, and the Mg content in the core material exceeding 1.5 mass % causes the solidus temperature (melting point) to lower, thereby increasing the possibility of causing the core material to be molten during brazing.

The brazing material according to the aluminum alloy brazing sheet of the present invention is an aluminum alloy brazing material including 4 to 13 mass % of Si, and the balance being Al and inevitable impurities. The Si content in the brazing material being less than 6 mass % does not provide sufficient brazing properties, and the Si content in the brazing material exceeding 13 mass % causes an easy formation of coarse primary crystal Si during casting and an easy occurrence of crack in manufacturing of the material, and lowers the plastic workability.

It is preferable that the brazing material according to the aluminum alloy brazing sheet of the present invention further include 0.004 to 0.2 by mass % of Bi, in addition to Si, from a viewpoint of increase in brazing properties. Bi is an element that promotes breaking the oxide film, with Mg supplied from the intermediate material and/or the core material to the brazing material during brazing heating, to improve the brazing properties. The Bi content in the brazing material being less than 0.004 mass % does not sufficiently provide the above-described effect, and the Bi content in the brazing material exceeding 0.2 mass % causes discoloration of the brazing material and a marked decrease in brazing properties.

The brazing material according to the aluminum alloy brazing sheet of the present invention may include at least one of Na, Sr, and Sb for refining Si grains in the brazing material. The Na content in the brazing material is preferably 0.003 to 0.030 mass %, more preferably 0.005 to 0.02 mass %. The Sr content in the brazing material is preferably 0.003 to 0.030 mass %, more preferably 0.005 to 0.02 mass %. The Sb content in the brazing material is preferably 0.00.3 to 0.030 mass %, more preferably 0.005 to 0.02 mass %.

The intermediate material according to the aluminum alloy brazing sheet of the present invention includes 0.4 to 6 mass % of Mg, further includes at least one of Mn, Cr, and Zr, and includes the balance being Al and inevitable impurities, having the Mn content not more than 2.0 mass %, the Cr content not more than 0.3 mass %, and the Zr content not more than 0.3 mass %, with the total content of Mn, Cr, and Zr being at least 0.1 mass %. That is, the intermediate material according to the aluminum alloy brazing sheet of the present invention includes Mg as a required element, and in addition to this Mg, includes at least one of Mn, Cr, and Zr.

The Mg included in the intermediate material has lower oxide formation free energy than that of aluminum, and thus they are diffused into the brazing material during brazing heating, and breaks an oxide film of aluminum covering the surface of the brazing material. When the brazing material includes Mg, the formation of oxide of Mg proceeds also at the stage of manufacturing the brazing sheet, whereby not only the added Mg is consumed wastefully, but also the surface oxide film becomes firmer. In this case, etching before brazing is necessary to peel off the oxide film. By contrast, when the intermediate material includes Mg, Mg is supplied to the brazing material from the intermediate material, and the formation of oxide of Mg does not proceed at the stage of manufacturing the brazing sheet. In this case, Mg is diffused to the brazing material from the intermediate material at the stage of brazing heating, thereby breaking the oxide film after melting of the brazing material.

The Mg content in the intermediate material is 0.4 to 6 mass %, preferably 1.3 to 5.5 mass %, and more preferably 2.5 to 5 mass %. The Mg content in the intermediate material less than 0.4 mass % causes deficiency of the Mg quantity diffused and eluted into the brazing material, and causes insufficiency in breaking effect on the oxide film on the surface of the brazing material. The Mg content in the intermediate material exceeding 6 mass % causes an easy occurrence of crack in manufacturing of the material, and difficulty in manufacturing of the brazing sheet.

The intermediate material includes Mg, and further includes at least one of Mn, Cr, and Zr, and in the Al—Mg-based intermediate material, Mn, Cr, and/or Zr included in the intermediate material have such an effect that suppresses grains from growing into coarse grains and refines the grains, so that Mg added to the intermediate material is smoothly supplied to the brazing material, thereby providing excellent brazing properties. Since elements are diffused faster at grain boundary compared with the inside the grains, as the grain size of the intermediate material becomes smaller, the grain boundary area that contacts the brazing material becomes greater. Accordingly, Mg is smoothly diffused to be supplied to the brazing material via the grain boundary. The molten brazing material is diffused via the grain boundary of the intermediate material to cause the melting point of the grain boundary to be lowered, so as to cause some of the intermediate material to be molten, thereby further increasing the supplying rate of Mg. In addition, since Mn has such an effect that increases deformation resistance in high temperatures, the intermediate material including Mn increases the deformation resistance thereof at the time of cladding by hot rolling, thereby providing an effect of reducing the fluctuation in clad ratio.

When the intermediate material includes Mn, the Mn content in the intermediate material is not more than 0.2 mass %, preferably 0.1 to 2.0 mass, and more preferably 0.3 to 1.5 mass %. The Mn content in the intermediate material exceeding 2.0 mass % causes an easy formation of giant intermetallic compounds during casting, and lowers the plastic workability.

When the intermediate material includes Cr, the Cr content in the intermediate material is not more than 0.3 mass preferably 0.05 to 0.3 mass %, and more preferably 0.1 to 0.2 mass %. The Cr content in the intermediate material exceeding 0.3 mass % causes an easy formation of giant intermetallic compounds during casting, and lowers the plastic workability.

When the intermediate material includes Zn, the Zr content in the intermediate material is not more than 0.3 mass %, preferably 0.05 to 0.3 mass %, and more preferably 0.1 to 0.2 mass %. The Zr content in the intermediate material exceeding 0.3 mass % causes an easy formation of giant intermetallic compounds during casting, and lowers the plastic workability.

The total content of Mn, Cr, and Zr in the intermediate material is at least 0.1 mass %. The total content of Mn, Cr, and Zr in the intermediate material being at least 0.1 mass % provides the effect of adding Mn, Cr and Zr.

The intermediate material includes at least one of Mg, Mn, Cr, and Zr, and may further include Si. The intermediate material including Si causes the solidus temperature of the intermediate material to decrease, so as to generate a liquid phase in a temperature region where the brazing material is molten, and to cause some of the intermediate material to be molten, thereby increasing the supplying rate of Mg to the brazing material and allowing the intermediate material to function as a brazing material. The Si content in the intermediate material is preferably 1 to 13 mass %. The Si content in the intermediate material being less than 1 mass % does not provide a sufficient effect brought thereby, and the Si content in the intermediate material exceeding 13 mass % causes an easy formation of coarse primary crystal Si during casting and an easy occurrence of crack in manufacturing of the material, and lowers the plastic workability.

In addition, the intermediate material includes at least one of Mg, Mn, Cr, and Zr, and may further include Bi. Bi promotes breaking the oxide film, with Mg supplied from the intermediate material and/or the core material to the brazing material during brazing heating, to improve the brazing properties. The brazing material including Bi forms a Bi-based thick oxide film at the stage of manufacturing material or during brazing heating, and causes discoloration and a marked decrease in the brazing properties. Therefore, the addition quantity of Bi to the brazing material is limited. By contrast, the intermediate material including Bi relaxes the limitation. The Bi content in the intermediate material is preferably 0.01 to 1.5 mass %, more preferably 0.1 to 1.0 mass %. A Bi content in the intermediate material less than 0.01 mass % causes deficiency of the quantity eluted into the brazing material, and prevents sufficiency of breaking effect on the oxide film on the surface of the brazing material. A Bi content in the intermediate material exceeding 1.5 mass % causes easy occurrence of crack in rolling of the material, and difficulty in manufacturing of the brazing sheet.

In addition, the intermediate material includes at least one of Mg, Mn, Cr, and Zr, and may further include Zn. Zn is effective, similarly to Si, in lowering the solidus temperature of the intermediate material and increasing the supplying rate of Mg to the brazing material. Moreover, the Zn has an effect of providing an electronegative potential to form a potential difference between the intermediate material and the core material, so as to provide a sacrificial anti-corrosion effect. The Zn content in the intermediate material is preferably 0.5 to 8 mass %, more preferably 0.9 to 6 mass %. A Zn content in the intermediate material less than 0.5 mass easily causes deficiency in lowering the solidus temperature and the sacrificial anti-corrosion effect. A Zn content in the intermediate material exceeding 8 mass % causes an easy occurrence of crack in rolling of the material, and difficulty in manufacturing of the brazing sheet.

The sacrificial anode material according to the aluminum alloy brazing sheet of the invention is a product for providing an anti-corrosion effect to the side of the sacrificial anode material. The sacrificial anode material according to the aluminum alloy brazing sheet of the present invention is a sacrificial anode material including 0.5 to 8 mass of Zn, and the balance being Al and inevitable impurities. The Zn content in the sacrificial anode material is 0.5 to 8 mass %, preferably 0.9 to 6 mass %. A Zn content in the sacrificial anode material less than 0.5 mass % causes deficiency in a sacrificial anode effect. A Zn content in the sacrificial anode material exceeding 8 mass % causes an easy occurrence of crack in rolling of the material, and difficulty in manufacturing of the brazing sheet.

The sacrificial anode material includes Zn and may further include Mn. Since Mn increases deformation resistance in high temperatures, the sacrificial anode material including Zn allows more stable clad rolling, thereby reducing a change in clad ratio. The Mn content in the sacrificial anode material is preferably 0.1 to 2.0 mass %, more preferably 0.2 to 1.2 mass %. A Mn content in the sacrificial anode material not more than 0.1 mass % causes deficiency in the effect. A Mn content in the sacrificial anode material exceeding 2.0 mass % causes an easy formation of giant intermetallic compounds during casting, and lowers the plastic workability.

The aluminum alloy brazing sheet according to the present invention preferably has an intermediate material having the average grain size of 200 μm or less. In the Al—Mg-based intermediate material, Mg included in the intermediate material is smoothly supplied to the brazing material, whereby the excellent brazing properties are provided. Since elements are diffused faster at gain boundary compared with the inside the grains, as the grain size of the intermediate material becomes smaller, the grain boundary area that contacts the brazing material becomes greater. Accordingly, Mg is smoothly diffused to be supplied to the brazing material via the grain boundary. The molten brazing material is diffused via the gain boundary of the intermediate material to cause the melting point of the grain boundary to be lowered, so as to cause some of the intermediate material to be molten, thereby further increasing the supplying rate of Mg. With the foregoing, the aluminum alloy brazing sheet according to the present invention preferably has the intermediate material having the average grain size of 200 μm or less, more preferably 150 μm or less, in that Mg is smoothly diffused to be supplied to the brazing material via the grain boundary, thereby providing excellent brazing properties. It is noted that the average grain size of the intermediate material was measured in conformance with ASTM E112-12 "Standard Test Methods for Determining Average Grain Size."

The aluminum alloy brazing sheet according to the present invention is used for a tube serving as a passage component material through which coolant flows, a plate to be joined with the tube to structure a thermal exchanger, and the like. The aluminum alloy brazing sheet according to the present invention is used for a tube material with the brazing sheet having a thickness of approximately 0.15 to 0.5 mm, with the corresponding clad ratio of the core material, the brazing material, the intermediate material, and the sacrificial anode material being normally 5 to 25%. The aluminum alloy brazing sheet according to the present invention is used for a plate material with the brazing sheet having a thickness of approximately 0.5 to 5 mm, with the corresponding clad ratio of the core material, the brazing material, the intermediate material, and the sacrificial anode material being approximately 1 to 20%.

The following describes a manufacturing method of the aluminum alloy brazing sheet according to the present invention. Manufacturing of the aluminum alloy brazing sheet according to the present invention includes at least one of the following manufacturing processes, so as to provide the aluminum alloy brazing sheet according to the present invention, and does not necessarily include all of the processes.

The aluminum alloy brazing sheet according to the present invention is manufactured by subjecting one side or both sides of a core material made of pure aluminum or aluminum alloy with the compositions described above to cladding with a brazing material made of aluminum alloy with the compositions described above, with the intermediate material made of aluminum alloy with the compositions described above interposed between the core material and the brazing material, or by subjecting one side of a core material made of pure aluminum or aluminum alloy with the compositions described above to cladding with a brazing material made of aluminum alloy with the compositions described above, with the intermediate material made of aluminum alloy with the compositions described above interposed between the core material and the brazing material, and subjecting the other side to cladding with a sacrificial anode material.

First, for the use of core material, brazing material, intermediate material, and sacrificial anode material, pure aluminum or aluminum alloy with the compositions described above are each molten, cast, and thereafter homogenized as required.

When ingots of the intermediate material are homogenized, Mn, Zr, or Cr, and Al that have been dissolved during casting are deposited as intermetallic compounds, and as the density of the intermetallic compounds increases, the grains of the intermediate material are refined. Temperatures during which the ingots of the intermediate material are homogenized preferably range from 400 to 600° C., the processing time preferably from 2 to 20 hours. The intermediate material of the aluminum alloy brazing sheet finally obtained by homogenizing the ingots of the intermediate material has the average grain size not more than 200 μm, preferably not more than 150 μm. In this manner, the grains of the intermediate material are able to be refined.

Next, the obtained brazing material, intermediate material, and ingots of sacrificial anode material are subjected to facing and hot rolling to the desired thickness, and further subjected to hot rolling in combination with the core material. In this case, the heating temperature before hot rolling is preferably between 400 and 550° C. After that, the combined materials are subjected to hot rolling to a thickness of 2 to 8 mm.

Next, the obtained clad material is subjected to cold rolling, and intermediate annealing or final annealing. When the clad material is subjected to intermediate annealing with the reduction ratio being at least 25% from a thickness obtained by the intermediate annealing to a thickness finally obtained, the intermediate material of the aluminum alloy brazing sheet finally obtained has the average grain size not more than 200 μm, preferably not more than 150 μm. In this manner, the grains of the intermediate material are able to be refined. When the clad material is subjected to the final annealing alone without being subjected to the intermediate annealing, the reduction ratio from a thickness at the time of completion of hot rolling to a thickness finally obtained is made at least 60%, so that the intermediate material of the aluminum alloy brazing sheet finally obtained has the average grain size not more than 200 μm, preferably not more than 150 μm. In this manner, the grains of the intermediate material are able to be refined.

The following describes examples of the present invention to prove the effects of the present invention. These examples illustrate an embodiment of the present invention, and the present invention is not limited thereto.

EXAMPLE

The brazing material, the core material, the intermediate material, and the sacrificial anode material having the compositions listed in Tables 1 and 3 were individually cast into ingots by continuous casting. For the core material, the obtained ingot was subjected to facing, and the brazing material, the intermediate material, and the sacrificial anode material were subjected to hot rolling to a certain thickness so as to have a desired clad ratio in Tables 1 to 3. For the intermediate material, an intermediate material was also manufactured that was subjected to homogenization under the condition in Table 4 before being subjected to hot rolling.

The brazing material, the core material, the intermediate material, and the sacrificial anode material prepared were subjected to clad rolling by a conventional method, to perform cold rolling, intermediate annealing, and final annealing to obtain a test material with a thickness of 0.4 mm under the condition in Table 3.

The average grain size of the intermediate material was measured in conformance with ASTM E112-12 "Standard Test Methods for Determining Average Grain Size." First, the manufactured test material was mirror-polished on the section thereof (L-LT surface) to provide figuring, then subjected to Barker's etch, a line was drawn on the intermediate material, the line being parallel with the boundary between the brazing material and the intermediate material, and a gain size of the corresponding intermediate material of a plurality of pieces of the test material was calculated based on a count intersecting with the grain boundary.

After the test material was pressed in a cup shape such that a side to which the brazing material is disposed is an inner surface side, two test materials are prepared. One material was prepared by subjecting the material to only decreasing (without etching) with acetone, and the other material was prepared by subjecting the material to degreasing with acetone and thereafter to etching with weak acid (with etching). Each of the test materials was incorporated into a cup test piece illustrated in FIG. 1. A fin obtained by forming and degreasing a 3003 alloy sheet material with a thickness of 0.1 mm was disposed inside the cup test piece, and brazed without flux.

The brazing heating was performed in a nitrogen gas furnace, or in a vacuum furnace. The nitrogen gas furnace was a batch experimental furnace, and the oxygen concentration thereof in brazing was 15 ppm to 20 ppm. The vacuum furnace was a batch type one-chambered experimental furnace, and the in-furnace pressure thereof in brazing was $5 \times 10^{-3}$ Pa to $8 \times 10^{-3}$ Pa. The temperature that each of the test pieces reached was set to 600° C.

In FIG. 1, 1 denotes a cup test piece, 2 denotes a test material, 3 denotes a fin, 4 denotes a flare groove joint, and 5 denotes a fillet formed outside the flare groove joint. The following evaluation was performed on at fillet 5 (expressed as "outside" in the cup brazing test in Tables 1 to 3) formed on the outside of the flare groove joint, and a fillet 6 (expressed as "inside" in the cup brazing test in Tables 1 to 3) formed in a joint portion between the test piece and the fin. Tables 1 to 3 list the evaluation results.

Figure 2:
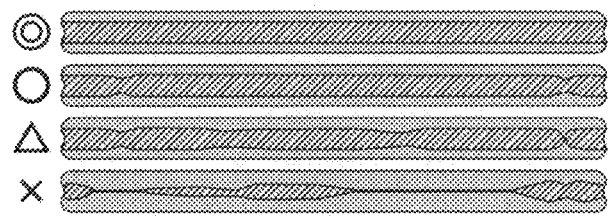
FIG. 2 is a diagram illustrating fillet formation states with evaluation of ⊚ to for a fillet formed on the external side of a flare groove joint of the cup test piece.

As illustrated in FIG. 2, for the "outside", the fillet 5 formed on the outside of the flare groove joint 4 was evaluated by observation with four levels. The four levels are: "⊚, a continuous fillet is formed with a uniform size", "○: a state in which 50% or more of the fillet has a uniform size although the fillet size fluctuates, or a state in which the fillet is small although the fillet has a uniform shape", "Δ: a state in which, the fillet is partly disconnected and discontinuous, or a state in which 50% or more of the fillet has a non-uniform size", and "X: fillet is hardly formed or the material is not brazed". Among the levels, ⊚ and ○ were determined as passing levels. For the "inside", the brazed test piece was divided into two, and the fillet formation state was evaluated by observation with four levels in the same manner as above, for the inside of the flare groove joint and the jointing portion of the fin.

TABLE 1

| Test Material No. | Cladding Structure | Chemical Composition (mass %) | | | | | | | | | | Process No. | Thickness (mm) | Clad Ratio (%) | Grain Size of Intermediate Material (μm) | Atmosphere | Cup Brazing Test Not Etched | Cup Brazing Test Etched | Note |
|---|---|---|---|---|---|---|---|---|---|---|---|---|---|---|---|---|---|---|---|
| | | Si | Fe | Cu | Mn | Mg | Cr | Zn | Ti | Zr | Bi | | | | | | | | |
| Examples 1 | Brazing Material | 4 | — | — | — | — | — | — | — | — | — | 1 | 0.4 | 15 | 90 | Nitrogen | Outside: ○ Inside: ○ | Outside: ○ Inside: ○ | |
| | Intermediate Material | — | — | 1.5 | 1.35 | — | — | — | — | — | — | | | — | | | | | |
| | Core Material | — | — | — | — | — | — | — | — | — | — | | | 5 | | | | | |
| 2 | Brazing Material | 13 | — | — | — | — | — | — | — | — | — | 1 | 0.4 | 10 | 160 | Nitrogen | Outside: ○ Inside: ○ | Outside: ○ Inside: ○ | |
| | Intermediate Material | — | 0.3 | — | 0.4 | — | 0.05 | — | — | — | — | | | — | | | | | |
| | Core Material | — | — | — | 1.2 | — | — | — | — | — | — | | | 10 | | | | | |
| 3 | Brazing Material | 10 | — | — | — | — | — | — | — | — | — | 1 | 0.4 | 10 | 55 | Nitrogen | Outside: ○ Inside: ◎ | Outside: ◎ Inside: ◎ | |
| | Intermediate Material | — | — | — | 0.1 | 5 | — | — | — | — | — | | | — | | | | | |
| | Core Material | — | — | — | 1.2 | — | — | — | — | — | — | | | 5 | | | | | |
| 4 | Brazing Material | 10 | — | — | — | — | — | — | — | — | — | 1 | 0.4 | 10 | 45 | Nitrogen | Outside: ○ Inside: ◎ | Outside: ◎ Inside: ◎ | |
| | Intermediate Material | — | — | — | — | — | 0.3 | — | — | — | — | | | — | | | | | |
| | Core Material | 1 | 0.5 | — | 1.2 | — | — | — | — | 0.15 | — | | | 5 | | | | | |
| 5 | Brazing Material | 10 | — | — | — | — | — | — | — | — | — | 1 | 0.4 | 10 | 50 | Nitrogen | Outside: ○ Inside: ◎ | Outside: ◎ Inside: ◎ | |
| | Intermediate Material | — | — | — | 2 | 2.55 | — | — | — | 0.1 | — | | | — | | | | | |
| | Core Material | — | — | 0.6 | 1.2 | — | — | — | 0.15 | — | — | | | 5 | | | | | |
| 6 | Brazing Material | 10 | — | — | — | — | — | — | — | — | — | 1 | 0.4 | 10 | 50 | Nitrogen | Outside: ○ Inside: ○ | Outside: ◎ Inside: ◎ | |
| | Intermediate Material | — | — | — | 5.5 | — | 0.15 | — | — | — | — | | | — | | | | | |
| | Core Material | 1 | — | — | — | 0.6 | — | — | — | 0.05 | — | | | 5 | | | | | |
| 7 | Brazing Material | 10 | — | — | — | — | — | — | — | — | — | 1 | 0.4 | 10 | 60 | Nitrogen | Outside: ◎ Inside: ◎ | Outside: ◎ Inside: ◎ | |
| | Intermediate Material | — | — | — | 1 | 3 | — | — | — | 0.3 | — | | | — | | | | | |
| | Core Material | — | — | 1.2 | — | 0.2 | — | — | — | — | — | | | 5 | | | | | |
| 8 | Brazing Material | 10 | — | — | — | — | — | — | — | — | — | 1 | 0.4 | 10 | 55 | Vacuum | Outside: ◎ Inside: ○ | Outside: ◎ Inside: ○ | |
| | Intermediate Material | — | — | — | 1 | 3 | — | — | — | — | — | | | — | | | | | |
| | Core Material | — | — | 1.2 | — | — | — | — | — | — | — | | | 5 | | | | | |
| 9 | Brazing Material | 10 | — | — | — | — | — | — | — | — | 0.05 | 1 | 0.4 | 10 | 65 | Nitrogen | Outside: ◎ Inside: ◎ | Outside: ◎ Inside: ◎ | |
| | Intermediate Material | 13 | — | — | 1 | 3 | — | — | — | — | — | | | — | | | | | |
| | Core Material | — | — | 1.2 | — | — | — | — | — | — | — | | | 5 | | | | | |

TABLE 1-continued

| Test Material No. | Cladding Structure | Chemical Composition (mass %) | | | | | | | | | | Process No. | Thickness (mm) | Clad Ratio (%) | Grain Size of Intermediate Material (μm) | Atmosphere | Cup Brazing Test | | Note |
|---|---|---|---|---|---|---|---|---|---|---|---|---|---|---|---|---|---|---|---|
| | | Si | Fe | Cu | Mn | Mg | Cr | Zn | Ti | Zr | Bi | | | | | | Not Etched | Etched | |
| 10 | Brazing Material | 10 | — | — | — | — | — | — | — | — | 0.05 | 1 | 0.4 | 10 | 55 | Nitrogen | Outside: ○ Inside: ◎ | Outside: ◎ Inside: ◎ | |
| | Intermediate Material | — | — | — | 1 | 3 | — | 0.5 | — | — | — | | | 5 | | | | | |
| | Core Material | — | — | 1.2 | 1.5 | — | — | — | — | — | — | | | — | | | | | |
| 11 | Brazing Material | 10 | — | — | — | — | — | — | — | — | 0.05 | 1 | 0.4 | 10 | 50 | Nitrogen | Outside: ◎ Inside: ◎ | Outside: ◎ Inside: ◎ | |
| | Intermediate Material | — | — | — | 1 | 3 | — | 8 | — | — | — | | | 5 | | | | | |
| | Core Material | — | — | 1.2 | — | — | — | — | — | — | — | | | — | | | | | |
| 12 | Brazing Material | 10 | — | — | — | — | — | — | — | — | 0.05 | 1 | 0.4 | 10 | 55 | Nitrogen | Outside: ○ Inside: ◎ | Outside: ◎ Inside: ◎ | |
| | Intermediate Material | — | — | — | 1 | 3 | — | — | — | — | — | | | 5 | | | | | |
| | Core Material | — | — | 1.2 | — | — | — | — | 0.2 | — | — | | | — | | | | | |
| | Sacrificial Anode Layer | — | — | — | 0.5 | — | — | 3 | — | — | — | | | 10 | | | | | |

TABLE 2

| Test Material No. | Cladding Structure | Chemical Composition (mass %) | | | | | | | | | | Process No. | Thickness (mm) | Clad Ratio (%) | Grain Size of Intermediate Material (μm) | Cup Brazing Test | | | Note |
|---|---|---|---|---|---|---|---|---|---|---|---|---|---|---|---|---|---|---|---|
| | | Si | Fe | Cu | Mn | Mg | Cr | Zn | Ti | Zr | Bi | | | | | Atmosphere | Not Etched | Etched | |
| Examples 13 | Brazing Material | 3 | — | — | — | — | — | — | — | — | — | 1 | 0.4 | — | 50 | — | — | — | Intermediate Material Occurrence of G.C |
| | Intermediate Material | — | — | — | 1 | — | 0.4 | — | — | — | — | | | 10 | | | | | |
| | Core Material | — | — | — | 1.2 | — | — | — | — | — | — | | | 5 | | | | | |
| 14 | Brazing Material | 14 | — | — | — | — | — | — | — | — | — | 1 | 0.4 | — | 60 | — | — | — | Brazing Material Occurrence of primary crystal Si Intermediate Material Occurrence of G.C |
| | Intermediate Material | — | — | — | 1 | 3 | — | — | — | 0.4 | — | | | 10 | | | | | |
| | Core Material | — | — | — | 1.2 | — | — | — | — | — | — | | | 5 | | | | | |
| 15 | Brazing Material | 10 | — | — | — | — | — | — | — | — | 0.05 | 1 | 0.4 | — | 240 | Nitrogen | Outside: X Inside: Δ | Outside: Δ Inside: Δ | |
| | Intermediate Material | — | — | — | 1 | — | 0.2 | — | — | — | — | | | 10 | | | | | |
| | Core Material | — | — | — | 1.2 | — | — | — | — | — | — | | | 5 | | | | | |
| 16 | Brazing Material | 10 | — | — | — | — | — | — | — | — | 0.05 | 1 | 0.4 | — | 30 | — | — | — | Occurrence of crack during rolling |
| | Intermediate Material | — | — | — | 1 | 7 | — | — | — | — | — | | | 10 | | | | | |
| | Core Material | — | — | — | 1.2 | — | — | — | — | — | — | | | 5 | | | | | |
| 17 | Brazing Material | 10 | — | — | — | — | — | — | — | — | 0.05 | 1 | 0.4 | — | 220 | Nitrogen | Outside: Δ Inside: Δ | Outside: ○ Inside: ○ | |
| | Intermediate Material | — | — | — | 0.01 | 0.4 | — | — | — | — | — | | | 10 | | | | | |
| | Core Material | — | — | — | 1.2 | — | — | — | — | — | — | | | 5 | | | | | |
| 18 | Brazing Material | 10 | — | — | — | — | — | — | — | — | 0.05 | 1 | 0.4 | — | 55 | — | — | — | Intermediate Material Occurrence of G.C |
| | Intermediate Material | — | — | — | 2.5 | 3 | — | — | — | — | — | | | 10 | | | | | |
| | Core Material | — | — | — | 1.2 | — | — | — | — | — | — | | | 5 | | | | | |
| 19 | Brazing Material | 10 | — | — | — | — | — | — | — | — | — | 1 | 0.4 | — | 65 | — | — | — | Occurrence of crack during rolling |
| | Intermediate Material | — | — | — | 1 | 3 | — | — | — | — | 1.7 | | | 10 | | | | | |
| | Core Material | — | — | — | 1.2 | — | — | — | — | — | — | | | 5 | | | | | |
| 20 | Brazing Material | 10 | — | — | — | — | — | — | — | — | — | 1 | 0.4 | — | 50 | — | — | — | Occurrence of crack during rolling |
| | Intermediate Material | — | — | — | 1 | 3 | — | 9 | — | — | — | | | 10 | | | | | |
| | Core Material | — | — | — | 1.2 | — | — | — | — | — | — | | | 5 | | | | | |

TABLE 2-continued

| Test No. | Material Cladding Structure | Chemical Composition (mass %) | | | | | | | | | | Process No. | Thickness (mm) | Clad Ratio (%) | Grain Size of Intermediate Material (μm) | Cup Brazing Test | | | Note |
|---|---|---|---|---|---|---|---|---|---|---|---|---|---|---|---|---|---|---|---|
| | | Si | Fe | Cu | Mn | Mg | Cr | Zn | Ti | Zr | Bi | | | | | Atmosphere | Not Etched | Etched | |
| 21 | Brazing Material | 10 | — | — | — | — | — | — | — | — | 0.05 | 1 | 0.4 | 10 | 65 | — | — | — | Intermediate Material Occurrence of primary crystal Si |
| | Intermediate Material | 14 | — | — | 1 | — | 3 | — | — | — | — | | | 5 | | | | | |
| | Core Material | — | — | — | 1.2 | — | — | — | — | — | — | | | — | | | | | |
| 22 | Brazing Material | 10 | — | — | — | — | — | — | — | — | 0.25 | 1 | 0.4 | 10 | 55 | — | Outside: X Inside: X | Outside: Δ Inside: Δ | |
| | Intermediate Material | — | — | — | 1 | — | 3 | — | — | — | — | | | 5 | | | | | |
| | Core Material | — | — | — | 1.2 | — | — | — | — | — | — | | | — | | | | | |

TABLE 3

| Test Material No. | Cladding Structure | Si | Fe | Cu | Mn | Mg | Cr | Zn | Ti | Zr | Bi | Process No. | Thickness (mm) | Clad Ratio (%) |
|---|---|---|---|---|---|---|---|---|---|---|---|---|---|---|
| Examples 23 | Brazing Material | 10 | — | — | — | — | — | — | — | — | — | 1 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 24 | Brazing Material | 10 | — | — | — | — | — | — | — | — | — | 2 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 25 | Brazing Material | 10 | — | — | — | — | — | — | — | — | — | 3 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 26 | Brazing Material | 10 | — | — | — | — | — | — | — | — | — | 4 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 27 | Brazing Material | 10 | — | — | — | — | — | — | — | — | — | 5 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 28 | Brazing Material | 10 | — | — | — | — | — | — | — | — | — | 6 | 0.4 | 10 |
| | Intermediate Material | — | — | — | 1 | 3 | — | — | — | — | — | | | 5 |
| | Core Material | — | — | — | 1.2 | — | — | — | — | — | — | | | — |
| 29 | Brazing Material | 10 | — | — | — | — | — | — | — | — | — | 7 | 0.4 | 10 |
| | Intermediate Material | — | — | — | 1 | 3 | — | — | — | — | — | | | 5 |
| | Core Material | — | — | — | 1.2 | — | — | — | — | — | — | | | — |

| Test Material No. | Cladding Structure | Grain Size of Intermediate Material (μm) | Cup Brazing Test | | | Note |
|---|---|---|---|---|---|---|
| | | | Atmosphere | Not Etched | Etched | |
| Examples 23 | Brazing Material Intermediate Material Core Material | 60 | Nitrogen | Outside: ○ Inside: ⊚ | Outside: ⊚ Inside: ⊚ | |
| 24 | Brazing Material Intermediate Material Core Material | 105 | Nitrogen | Outside: ○ Inside: ⊚ | Outside: ⊚ Inside: ⊚ | |
| 25 | Brazing Material Intermediate Material Core Material | 210 | Nitrogen | Outside: ○ Inside: ○ | Outside: ○ Inside: ○ | |
| 26 | Brazing Material Intermediate Material Core Material | 180 | Nitrogen | Outside: ○ Inside: ○ | Outside: ○ Inside: ⊚ | |
| 27 | Brazing Material | 130 | Nitrogen | Outside: ○ Inside: ⊚ | Outside: ○ Inside: ⊚ | |

TABLE 3-continued

| | | | | | | |
|---|---|---|---|---|---|---|
| 28 | Intermediate Material Core Material Brazing Material Intermediate Material Core Material | 95 | Nitrogen | Outside: ○ Inside: ◉ | Outside: ○ Inside: ◉ | |
| 29 | Brazing Material Intermediate Material Core Material | 55 | Nitrogen | Outside: ○ Inside: ◉ | Outside: ◉ Inside: ◉ | |

TABLE 4

| Manufacturing Process No. | Homogenization Condition of Intermediate Material | Heating Temperature before Hot Rolling | Intermediate Annealing Condition | Final Annealing Condition | Final Reduction | Temper |
|---|---|---|---|---|---|---|
| 1 | 500° C. × 8 h | 500° C. | — | 370° C. × 2 h | 85% | ○ |
| 2 | — | 500° C. | — | 370° C. × 2 h | 85% | ○ |
| 3 | 500° C. × 8 h | 500° C. | 370° C. × 2 h | 370° C. × 2 h | 20% | ○ |
| 4 | 500° C. × 8 h | 500° C. | 370° C. × 2 h | 370° C. × 2 h | 25% | ○ |
| 5 | 500° C. × 8 h | 500° C. | 370° C. × 2 h | — | 50% | H1n |
| 6 | 500° C. × 8 h | 500° C. | 370° C. × 2 h | 250° C. × 2 h | 50% | H2n |
| 7 | 500° C. × 8 h | 500° C. | — | 250° C. × 2 h | 85% | H2n |

As listed in Tables 1 to 3, each of the cup test pieces obtained by incorporating the test materials 1 to 12, and 23 to 29 in the examples proved to be capable of producing an excellent brazed, state of a passing level, without etching.

Test material No. 25 had no status observed that the fillet is partly disconnected, with all of the brazing properties evaluated as ○, but had the number of changes in the size of the fillet comparatively frequently observed.

Test material Nos. 26 and 27 had a small number of changes in the size of the fillet compared with the above, and had a stable fillet formation, with all of the brazing properties evaluated as ○ or above.

By contrast, the comparative examples resulted in the following.

Test material No. 13 had occurrence of giant intermetallic compounds (G.C.) during casting due to an extreme amount of the addition quantity of Cr to the intermediate material.

Test material No. 14 had occurrence of primary crystal Si during casting due to an extreme amount of the addition quantity of Si to the brazing material, and occurrence of G.C., due to an extreme amount of the addition quantity of Zr to the intermediate material.

Test material No. 15 had deficiency in the film break effect during brazing due to an extremely small amount of the addition quantity of Mg to the intermediate material, resulting in lower brazing properties both inside and outside.

Test material No. 16 had occurrence of crack during rolling due to an extreme amount of the addition quantity of Mg to the intermediate material.

Test material No. 17 had a large grain size of the intermediate material due to an extremely small amount of the addition quantity of Mn to the intermediate material, and deficiency in Mg supplied to the surface of the brazing material, resulting in lower brazing properties without etching.

Test material No. 18 had occurrence of G.C. during casting due to an extreme amount of the addition quantity of Mn to the intermediate material.

Test material No. 19 had occurrence of crack during rolling due to an extreme amount of the addition quantity of Bi to the intermediate material.

Test material No. 20 had occurrence of crack during rolling due to an extreme amount of the addition quantity of Zn to the intermediate material.

Test material No. 21 had occurrence of primary crystal Si during casting due to an extreme amount of the addition quantity of Si to the intermediate material.

Test material No. 22 had an oxide film having an extremely large thickness on the surface of the brazing material formed in manufacturing of the material or brazing temperature rising due to an extremely large amount of the addition quantity of Bi to the brazing material, and failed to sufficiently break the oxide film during brazing, resulting in lower brazing properties especially without etching.

The invention claimed is:

1. An aluminum alloy brazing sheet used for brazing aluminum in an inert gas atmosphere or vacuum, the brazing sheet comprising:
   a core material made of pure aluminum or aluminum alloy, on one side or both sides of the core material, being clad with a brazing material, with an intermediate material interposed between the core material and the brazing material, the intermediate material consisting of 0.4 to 6 mass % of Mg, 0.1 to 1.5 mass % of Bi, at least one of Mn, Cr, and Zr, optionally 1 to 13 mass % of Si, optionally 0.5 to 8 mass % of Zn, and the balance being Al and inevitable impurities, having the Mn content not more than 2.0 mass %, the Cr content not more than 0.3 mass %, and the Zr content not more than 0.3 mass %, with the total content of Mn, Cr, and Zr being at least 0.1 mass %, the brazing material consisting of 4 to 13 mass % of Si, optionally 0.004 to 0.2 mass % of Bi, optionally at least one of 0.003 to 0.030 mass % of Na, 0.003 to 0.030 mass % of Sr, and 0.003 to 0.030 mass % of Sb, and the balance being Al and inevitable impurities.

2. The aluminum alloy brazing sheet according to claim 1, wherein the intermediate material has average grain size of 200 μm or less.

3. The aluminum alloy brazing sheet according to claim 1, wherein the core material includes at least one of Mn not more than 1.8 mass %, Si not more than 1.5 mass %, Fe not more than 1.0 mass %, Cu not more than 1.2 mass %, Ti not more than 0.3 mass %, and Zr not more than 0.3 mass %, and the balance being Al and inevitable impurities.

4. The aluminum alloy brazing sheet according to claim 3, wherein the core material further includes 0.2 to 1.5 mass % of Mg.

5. The aluminum alloy brazing sheet according to claim 1, wherein the amount of Bi in the brazing material is 0.004 to 0.2 mass %.

6. The aluminum alloy brazing sheet according to claim 1, wherein the amount of Si in the intermediate material is 1 to 13 mass %.

7. The aluminum alloy brazing sheet according to claim 1, wherein the amount of Zn in the intermediate material is 0.5 to 8 mass %.

8. The aluminum alloy brazing sheet according to claim 1, wherein one side of the core material is clad with the brazing material with the intermediate material interposed therebetween, and the other side of the core material is clad with a sacrificial anode material including 0.5 to 8 mass % of Zn, the balance being Al and inevitable impurities.

9. The aluminum alloy brazing sheet according to claim 8, wherein the sacrificial anode material further includes 0.1 to 2.0 mass % of Mn.

* * * * *